US009951650B2

(12) United States Patent
Noel et al.

(10) Patent No.: US 9,951,650 B2
(45) Date of Patent: Apr. 24, 2018

(54) BEARING SUPPORT HAVING A GEOMETRY FOR EASIER EVACUATION OF CASTING CORES

(71) Applicant: SNECMA, Paris (FR)

(72) Inventors: Frederic Noel, Moissy-Cramayel (FR); Benoit Argemiro Matthieu Debray, Moissy-Cramayel (FR); Mario Cesar De Sousa, Moissy-Cramayel (FR); Gregory Ghosarossian-Prillieux, Moissy-Cramayel (FR); Nicolas Pommier, Moissy-Cramayel (FR)

(73) Assignee: SNECMA, Paris (FR)

( * ) Notice: Subject to any disclaimer, the term of this patent is extended or adjusted under 35 U.S.C. 154(b) by 575 days.

(21) Appl. No.: 14/547,525

(22) Filed: Nov. 19, 2014

(65) Prior Publication Data
US 2015/0139785 A1     May 21, 2015

(30) Foreign Application Priority Data

Nov. 20, 2013 (FR) .................................. 13 61418
Dec. 5, 2013 (FR) .................................. 13 62184

(51) Int. Cl.
*F01D 25/16* (2006.01)
*F02C 7/06* (2006.01)
(Continued)

(52) U.S. Cl.
CPC ........... *F01D 25/162* (2013.01); *F01D 25/18* (2013.01); *F02C 7/06* (2013.01); *F16C 33/76* (2013.01);
(Continued)

(58) Field of Classification Search
CPC ...... F01D 9/065; F01D 11/001; F01D 25/125; F01D 25/16; F01D 25/18; F01D 25/183;
(Continued)

(56) References Cited

U.S. PATENT DOCUMENTS

| 4,066,116 A | * | 1/1978 | Blazek | ...................... B22C 9/04 |
| | | | | 164/137 |
| 4,137,705 A | * | 2/1979 | Andersen | .................. F02C 7/14 |
| | | | | 60/39.08 |

(Continued)

FOREIGN PATENT DOCUMENTS

| EP | 0 852 286 A2 | 7/1998 |
| EP | 1 731 733 A2 | 12/2006 |

(Continued)

OTHER PUBLICATIONS

French Preliminary Search Report dated Jul. 29, 2014 in Patent Application No. 1361418 (with English Translation of Category of Cited Documents).

(Continued)

*Primary Examiner* — Logan Kraft
*Assistant Examiner* — Joshua R Beebe
(74) *Attorney, Agent, or Firm* — Oblon, McClelland, Maier & Neustadt, L.L.P.

(57) ABSTRACT

The invention relates to a turbomachine bearing support (1) supporting at least one bearing and extending according to a longitudinal principal axis of the turbomachine and comprising:
  a truncated part (11) having a diameter increasing from upstream to downstream;
  a flange part (12) which extends from the truncated part (11) as far as the bearing (5, 6) to which it is fixed by an axial flange (121), and having at its downstream end a radial internal flange (17) fixed to an oil inlet cover defining with the bearing (5, 6) an oil inlet container (170);
  oiled air clearance ducts (71) projecting downstream relative to the flange part (12) and on the oil inlet
(Continued)

container (170) and to the other side upstream of the flange part (12) directly radially externally relative to the axial flange (121).

8 Claims, 6 Drawing Sheets (51) Int. Cl.
F01D 25/18 (2006.01)
F16C 33/76 (2006.01)
F16C 35/04 (2006.01)
F16C 35/067 (2006.01)

(52) U.S. Cl.
CPC .......... F16C 35/045 (2013.01); F16C 35/067 (2013.01); *F05D 2220/323* (2013.01); *F05D 2230/232* (2013.01); *F05D 2240/50* (2013.01)

(58) Field of Classification Search
CPC ............ F01D 25/162; F05D 2220/323; F05D 2240/50; F05D 2230/232; F02C 7/06; F16C 33/76; F16C 35/045; F16C 35/067
See application file for complete search history.

(56) References Cited

U.S. PATENT DOCUMENTS

| 5,776,229 | A | * | 7/1998 | Blanes | B01D 45/14 55/407 |
|---|---|---|---|---|---|
| 5,813,214 | A | | 9/1998 | Moniz et al. | |
| 6,073,678 | A | * | 6/2000 | Garza-Ondarza | B22D 47/00 164/130 |
| 7,802,962 | B2 | * | 9/2010 | Sjoqvist | F01D 25/162 415/142 |
| 8,894,538 | B2 | * | 11/2014 | McCune | F01D 5/027 475/331 |
| 2006/0272314 | A1 | | 12/2006 | Moniz et al. | |
| 2008/0031727 | A1 | | 2/2008 | Sjoqvist | |
| 2008/0181763 | A1 | * | 7/2008 | Webster | F01D 21/045 415/9 |
| 2009/0191046 | A1 | * | 7/2009 | Bart | B01D 45/14 415/110 |
| 2010/0021286 | A1 | | 1/2010 | Somanath et al. | |
| 2012/0107087 | A1 | | 5/2012 | Somanath et al. | |
| 2013/0183142 | A1 | | 7/2013 | Durand et al. | |

FOREIGN PATENT DOCUMENTS

| EP | 2 148 046 A2 | 1/2010 |
|---|---|---|
| FR | 2 752 024 A1 | 2/1998 |
| WO | WO 2006/038842 A1 | 4/2006 |

OTHER PUBLICATIONS

French Preliminary Search Report dated Jul. 30, 2014 in Patent Application No. 1362184 (with English Translation of Category of Cited Documents).

* cited by examiner

BEARING SUPPORT HAVING A GEOMETRY FOR EASIER EVACUATION OF CASTING CORES

FIELD OF THE INVENTION

The present invention relates to turbomachines and more particularly turbojet bearing supports.

PRIOR ART

According to the configuration of the turbomachine in which the direction of flow of gases proceeds from upstream to downstream, the bearing support can ensure several functions. It supports the upstream and/or downstream bearings, participates in centring of the rotor, and participates in sealing of the enclosure downstream by means of its sealing ferrule. In the case of sharp engine inclination, it enables recovery of any oil surplus accumulated in the bearing enclosure downstream. It feeds the downstream bearing with oil. It holds the oil inlet cover by means of the radial internal flange. It allows ventilation and balancing of pressures in the enclosure via these different clearance holes.

The design of this piece is all the more delicate sine in addition to these functions the bearing support must respond to the requirements of mechanical dimensioning in its environment, specifically the exhaust casing and the rotor, and especially must uphold the criteria of mechanical performance in case of engine failure, avoid dynamic resonance of the ferrule on the engine operation range and respect clearances with those pieces located in the nearby environment.

These many functions and the limited bulk involve complex geometry needing a particular casting production method.

Bearing supports requiring moulding by lost wax method are known since their geometry disallows extraction from a core. The wax must be extracted by hand, which is an obstacle to automation of manufacturing of these bearing supports.

EXPLANATION OF THE INVENTION

The invention eliminates at least one of the above disadvantages by proposing a bearing support having a geometry for easier evacuation of casting cores.

For this purpose the invention proposes a turbomachine bearing support, and particularly a turbojet bearing support supporting at least one bearing, said support extending along a principal longitudinal axis corresponding to the longitudinal axis of the turbomachine and comprising:
 a truncated part having a diameter increasing from upstream to downstream;
 a flange part which extends from the truncated part as far as the bearing to which it is fixed by an axial flange, the flange part having at its downstream end a radial internal flange fixed to an oil inlet cover defining an oil inlet container with the bearing;
 a plurality of oiled air clearance ducts projecting from the flange part;
the bearing support being characterized in that the oiled air clearance ducts projecting downstream relative to the flange part terminate to one side on the oil inlet container and to the other side upstream of the flange part directly radially externally relative to the axial flange.

Such a form of the bearing support and more precisely the form of the oiled air clearance ducts allows extraction in the principal axis of the bearing support from the cores which have acted as moulding of the bearing support. In particular, the fact that the oiled air clearance ducts terminate upstream of the flange part radially externally relative to the axial flange enables extraction from cores in the principal axis of the bearing support, without damaging the flange part of the bearing support.

The invention is advantageously completed by the following characteristics, taken individually or in any of their technically possible combinations.

The distance d which separates the external surface of the transversal flange and the internal edge of the oiled air clearance hole is substantially zero.

The transversal flange extends parallel to the axis A of the turbomachine, the axial flange 121 forming the internal edge of the flange part 12.

The oiled air clearance ducts each have a transversal cross-section substantially in a form from among rectangular, circular and oval shapes.

The turbojet bearing support comprises a plurality of ducts, in particular four oiled air clearance ducts which are preferably regularly angularly distributed. The fact that the bearing support comprises only four oiled air clearance ducts and not a larger number as for bearing supports of the prior art increases their respective transversal cross-section without increasing the total cross-section of all the ducts. As a consequence, the oiled air clearance ducts are wide enough to make it possible to axially extract the cores used for moulding of the bearing support.

The flange part is truncated, its diameter decreasing downstream.

The invention also relates to a manufacturing method of a bearing support comprising the following steps:
 making a mould comprising one or more cores and corresponding to a hollow imprint of the bearing support,
 cast from metal brought to liquid state in the mould;
 extraction from the cores in the principal axis of the bearing support.

The fact that extraction from a core or cores is done in the principal axis of the bearing support allows automation of extraction from cores without damaging the flange part of the bearing support during extraction.

The invention also relates to a core for the moulding of a bearing support, characterized in that it comprises one or more cores and corresponds to a hollow imprint of the bearing support described earlier.

DESCRIPTION OF FIGURES

Other aims, characteristics and advantages will emerge from the following detailed description in reference to the drawings given by way of illustration and non-limiting, in which.

DETAILED DESCRIPTION OF THE INVENTION

Figure 1:
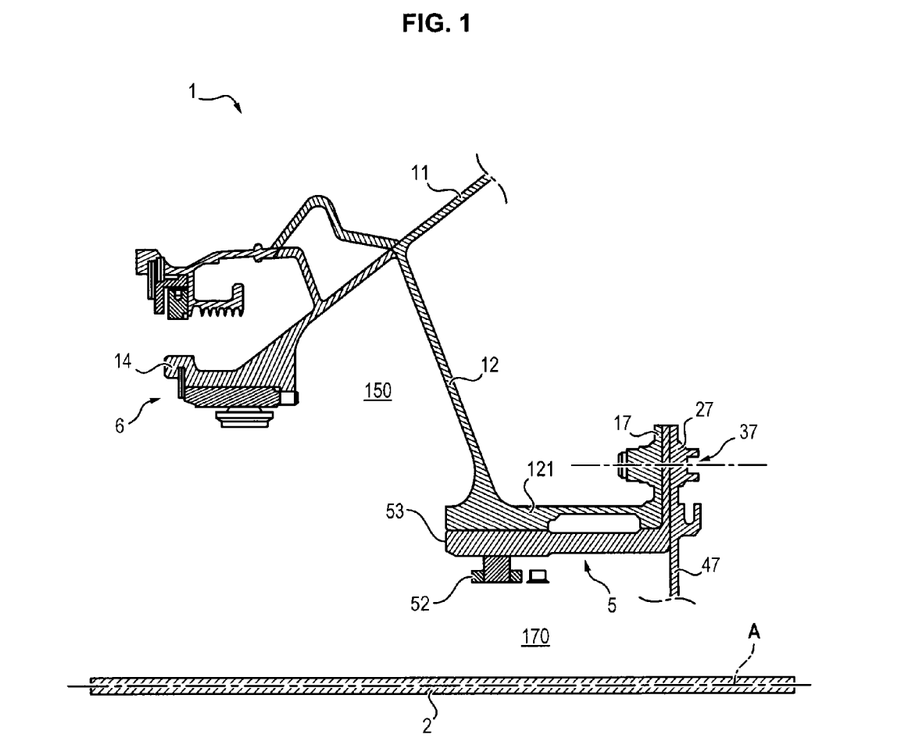
FIG. 1 is a view in radial semi-section of an example of bearing support in keeping with the invention, between two oiled air clearance ducts.
Figure 2:
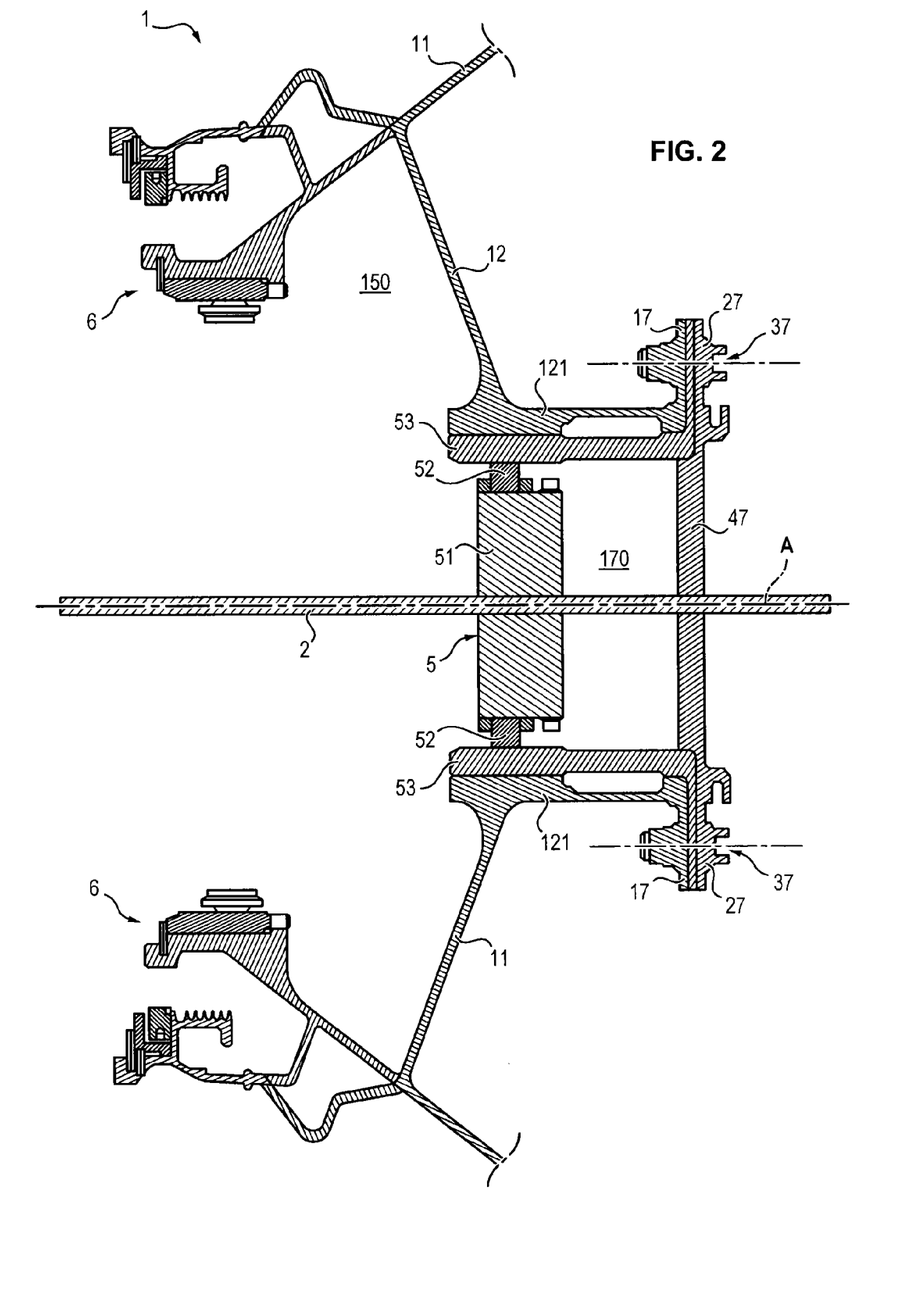
FIG. 2 is a view in radial section of an example of the bearing support, between two oiled air clearance ducts.

In reference to FIGS. 1 and 2, a shaft 2 is guided in rotation according to the geometric axis A and positioned in translation by an upstream bearing 6 connected to a turbomachine casing (not shown) by means of a bearing support 1. This upstream bearing 6 is arranged just behind the fan section. The shaft 2 is also guided behind the turboengine by a downstream bearing 5 also connected to the casing of the turboengine (not shown) by means of the bearing support 1.

The bearing support 1 is a piece having a symmetry around a principal longitudinal axis corresponding to the axis A of the turbomachine. The bearing support 1 has a truncated part 11 which extends as it widens from upstream to downstream, from the upstream bearing 6. The bearing support 1 also has a flange part 12 which extends from a middle point of the truncated part as far as the downstream bearing 5. The flange part 12 is truncated, its diameter decreasing downstream. The truncated part 11 is extended upstream by an internal ferrule 14. The internal ferrule 14 is a ring whereof the longitudinal cross-section extends parallel to axis A of the turbojet from the end upstream of the truncated part 11. The truncated part 11 defines by its external space a bearing enclosure upstream 160 (FIGS. 3 and 4) and by its internal space a downstream bearing enclosure 150 (FIGS. 3 and 4).

The flange part 12 of the bearing support 1 has a radial internal flange 17 at its downstream end. The radial internal flange 17 is fixed to an oil inlet cover 47 for example by bolts 37 passing through orifices 27 arranged on the radial internal flange 17. The oil inlet cover 47 and the downstream bearing 5 jointly define an oil inlet container 170 (FIGS. 2 to 4).

Figure 3:
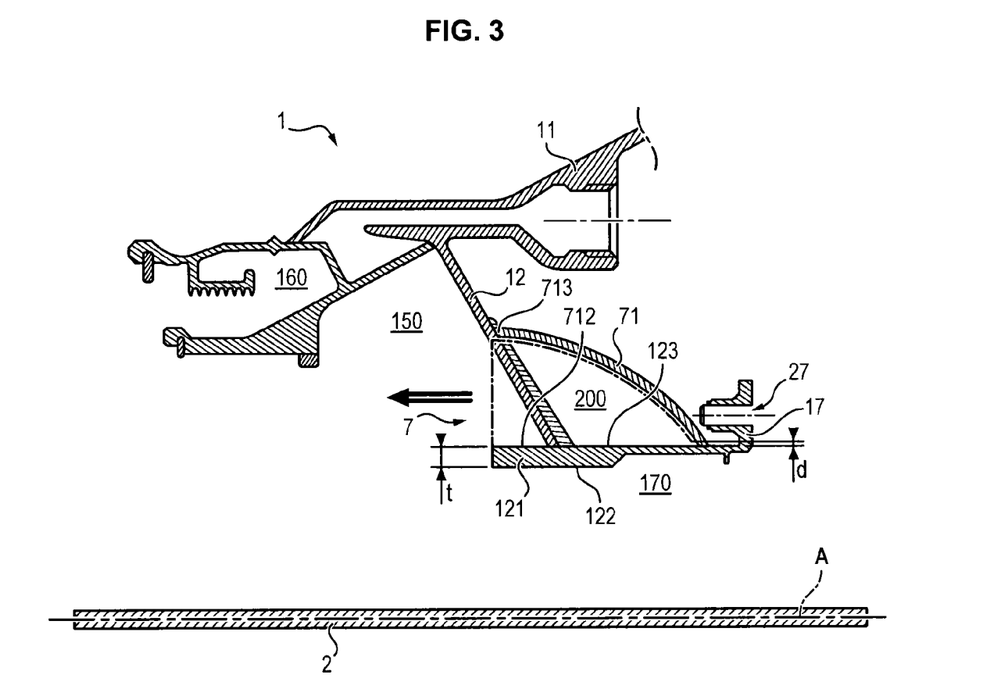
FIG. 3 is a view in radial semi-section of an example of bearing support in keeping with the invention at the level of an oiled air clearance duct.
Figure 4:
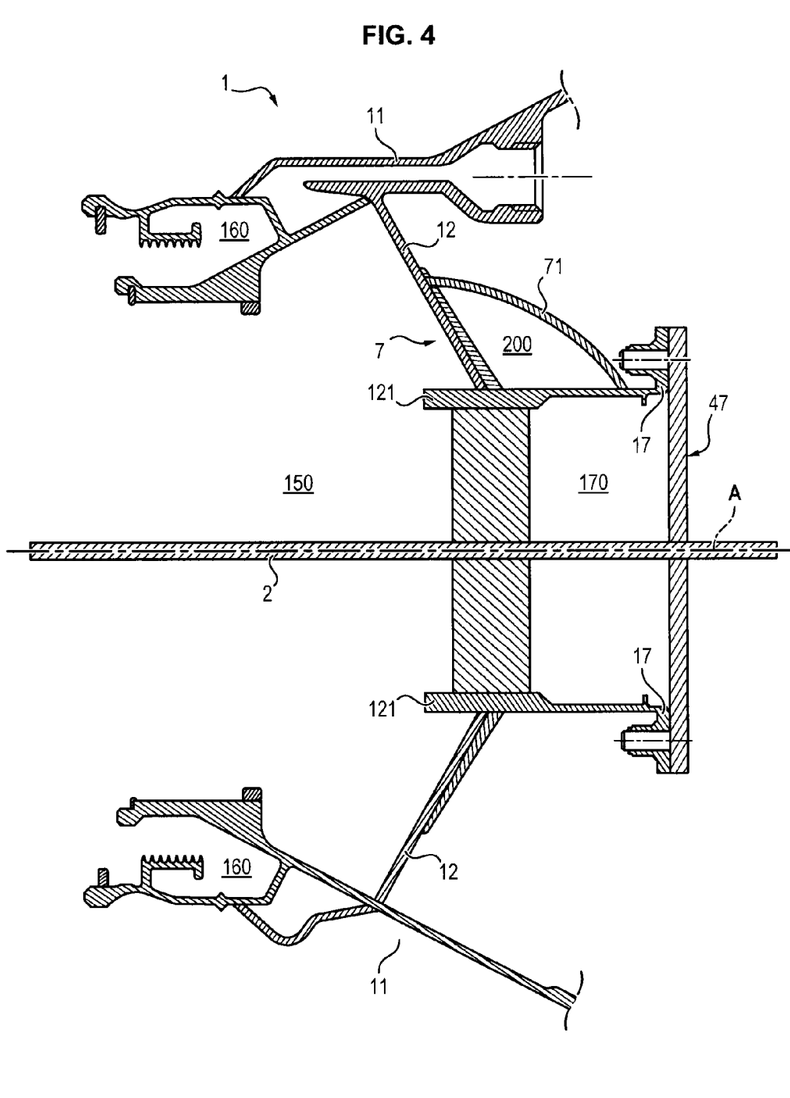
FIG. 4 is a view in radial section of the bearing support at the level of an oiled air clearance duct.
Figure 5:
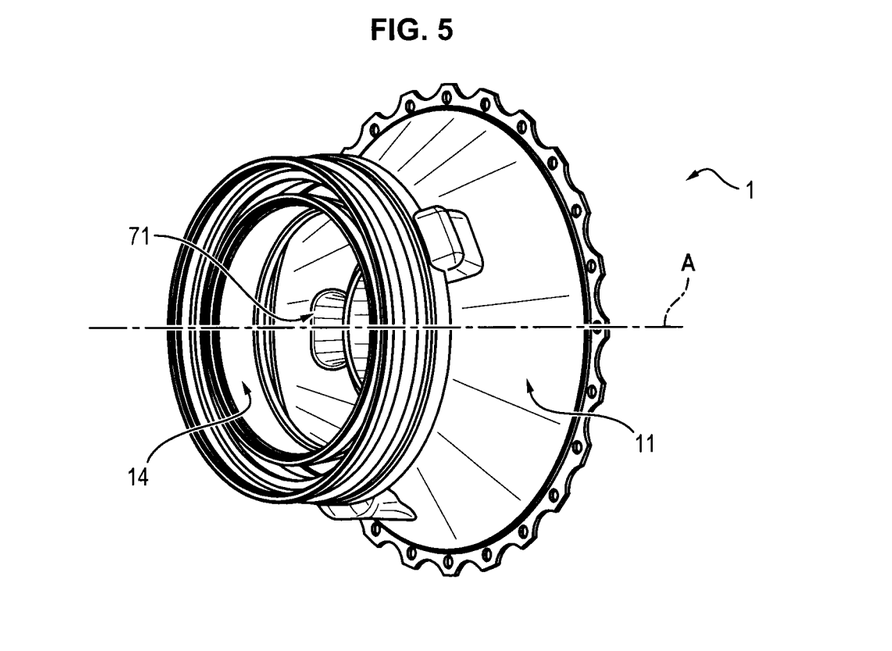
FIGS. 5 to 8 are views in perspective of this bearing support.
Figure 6:
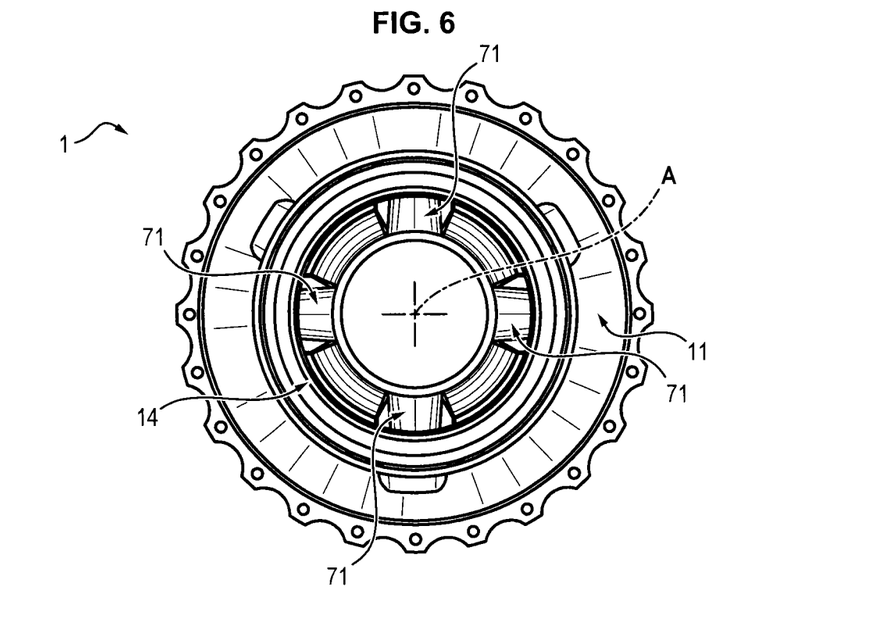
Figure 7:
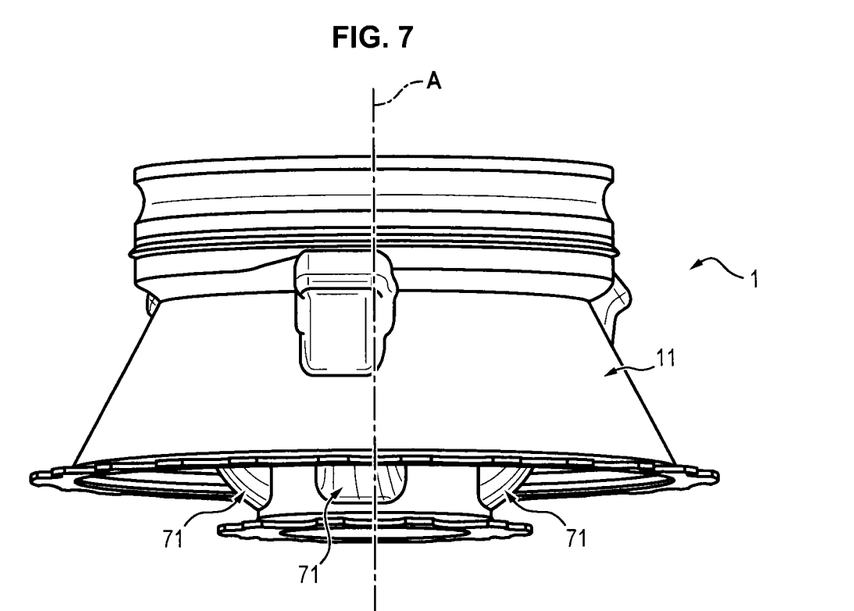
Figure 8:
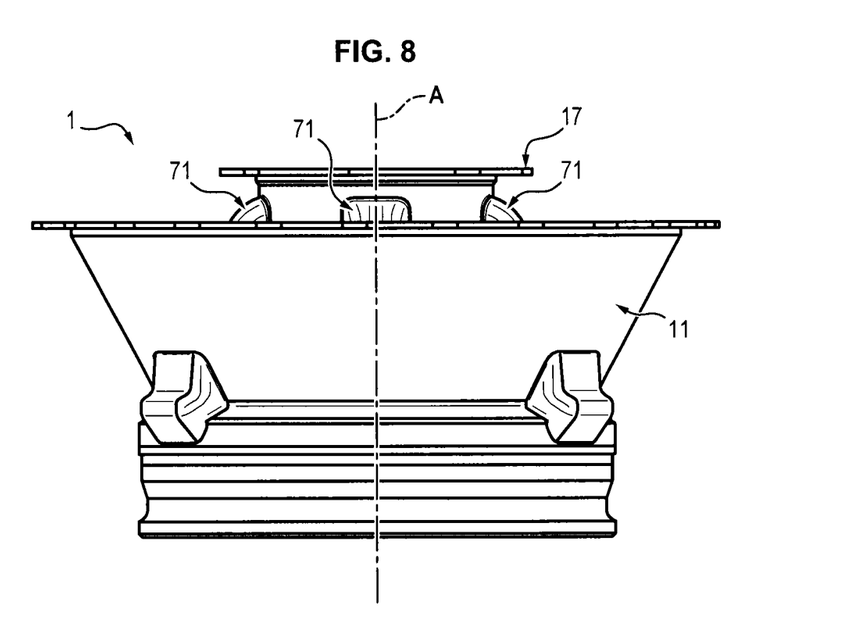

In reference to FIGS. 1 to 3, the downstream bearing 5 comprises an internal ring 51 and an external ring 52, between which are mounted rollers or others rolling members. The internal ring 51 is connected solidly to the shaft of the compressor 2 and the external ring 52 is mounted connected to the bearing support 1. The flange part 12 has at its downstream end an axial flange 121 extending parallel to the axis A of the turbojet. This axial flange 121 forms the internal edge of the flange part 12. The external ring 52 of the downstream bearing 5 comprises, on its external face, an intermediate flange 53 fixed to the bearing support 1 on the axial flange 121. The axial flange 121 has a non-zero thickness t.

In reference to FIGS. 3 to 8, the flange part 12 has a plurality of oiled air clearance holes 7 for passage of oiled air. The bearing support 1 comprises a plurality of oiled air clearance ducts 71 terminating to one side on the oil inlet container 170 and of the other side upstream of the flange part 12 directly radially externally relative to the axial flange 121 at the level of one of the oiled air clearance holes 7. Radially externally means outside the axial flange 121 in a radial direction defined relative to the axis A. These oiled air clearance ducts 71 project from the flange part 12 downstream of the latter. The bearing support 1 advantageously comprises four oiled air clearance ducts 71 distributed uniformly and angularly at 90° relative to the principal axis A of the bearing support 1.

These oiled air clearance ducts 71 each have a transversal cross-section substantially of a form from among rectangular, circular and oval shapes of a surface considerably enlarged relative to those of the prior art, which enables evacuation of casting cores having acted as moulding of the bearing support 1 by the oiled air clearance ducts 71. The sum of the transversal cross-sections of the oiled air clearance ducts 71 corresponds to the minimal cross-section for passage of oiled air. The fact that the bearing support 1 has no more than four oiled air clearance ducts 71 and not a larger number than bearing supports of the prior art increases their respective cross-section without increasing the total cross-section of all the oiled air clearance ducts 71, which has oiled air clearance ducts 71 wide enough to extract those cores used in moulding of the bearing support.

In reference to FIG. 3, the axial flange 121 has an advantageously non-zero thickness t. The axial flange 121 has an external surface 123 and an internal surface 122. For the oiled air clearance holes 7, an external edge 713 and an internal edge 712 defined respectively as the edge of the oiled air clearance hole 7 farthest from the shaft 2 and the edge of the oiled air clearance hole 7 nearest the shaft 2 are also defined. The distance d which separates the external surface 123 of the axial flange 121 and the internal edge 712 of the oiled air clearance hole 7 is substantially zero.

The bearing support 1 can be made by a casting manufacturing method using an mould comprising cores 200 and enabling automatic demoulding. The oiled air clearance ducts 71 are obtained by cores 200 (FIG. 3) positioned appropriately in the mould substantially parallel to the principal axis of the bearing support 1. The manufacturing method of the bearing support 1 described earlier comprises the following steps. After a hollow imprint of the piece to be obtained comprising a mould and cores 200 is made, metal brought to the liquid state is poured by gravity into the hollow imprint.

After solidification of the alloy, the cores 200 used to mould the oiled air clearance ducts 71 are extracted. The form of the bearing support 1 and more precisely the form of the oiled air clearance ducts 71 enables extraction of the cores 200 along the principal axis of the bearing support 1 corresponding to the axis A, as shown by arrows in double lines in FIGS. 3 and 4. The fact that extraction of the cores 200 is done in the principal axis of the bearing support 1 enables automation of their evacuation without damaging the flange part 12 of the bearing support during extraction. This configuration also easily loosens the wax from the region of the radial internal flange 17.

The invention claimed is:
1. A turbojet bearing support that supports at least one bearing, said support extending according to a longitudinal principal axis corresponding to a longitudinal axis of a turbomachine and comprising:
 a truncated part having a diameter increasing from upstream to downstream;
 a flange part which extends from the truncated part as far as the bearing to which it is fixed by an axial flange, the flange part having at its downstream end a radial internal flange fixed to an oil inlet cover defining with the bearing an oil inlet container;
 a plurality of oiled air clearance ducts projecting from the flange part;
 the bearing support comprising the oiled air clearance ducts projecting downstream relative to the flange part terminate to one side on the oil inlet container and to the other side upstream of the flange part directly radially external relative to the axial flange and wherein the distance which separates an external surface of the axial flange and an internal edge of oiled air clearance holes, at the level of which the oiled air clearance ducts terminate upstream of the flange part, is substantially zero.

2. The turbojet bearing support according to claim 1, wherein the axial flange extends parallel to the axis of the turbomachine, the axial flange forming the internal edge of the flange part.

3. The turbojet bearing support according to claim 1, wherein the oiled air clearance ducts each advantageously have a transversal cross-section substantially of a form among rectangular, circular and oval forms.

4. The turbojet bearing support according to claim 1, comprising four oiled air clearance ducts, in particular regularly angularly distributed along the principal axis of the bearing support.

5. The turbojet bearing support according to claim 1, whereof the flange part is truncated, its diameter decreasing downstream.

6. A manufacturing method of a bearing support according to claim 1, comprising the following steps:
    making a mould comprising one or more cores and corresponding to a hollow imprint of the bearing support,
    casting of metal brought to the liquid state and poured in the mould;
    extracting the cores in the principal axis of the bearing support.

7. The manufacturing method of a bearing support according to claim 6, wherein the extracting the cores is automated.

8. A mould for moulding a bearing support, comprising one or more cores and corresponds to a hollow imprint of the bearing support according to claim 1.

\* \* \* \* \*